United States Patent [19]

Silano et al.

[11] 4,400,480

[45] Aug. 23, 1983

[54] PROCESS FOR PREPARING CORRUGATED PAPERBOARD

[75] Inventors: Michael A. Silano, Somerset, N.J.; Robert D. Featherston, Salisbury, N.C.

[73] Assignee: National Starch and Chemical Corporation, Bridgewater, N.J.

[21] Appl. No.: 414,196

[22] Filed: Sep. 2, 1982

Related U.S. Application Data

[62] Division of Ser. No. 268,960, Jun. 1, 1981, Pat. No. 4,366,275.

[51] Int. Cl.³ .......................... C09J 3/06; C08J 3/10; C08L 3/04; C08L 61/02
[52] U.S. Cl. .................................. 524/47; 156/328; 156/331.3; 156/336; 156/DIG. 66; 156/DIG. 113; 523/208; 106/213
[58] Field of Search ............... 156/328, 331.3, 336, 156/DIG. 66, DIG. 113; 523/208; 524/47, 49; 106/213

[56] References Cited

U.S. PATENT DOCUMENTS

| | | | |
|---|---|---|---|
| 3,019,120 | 1/1962 | Bauer | 106/213 |
| 3,359,223 | 12/1967 | Nakamura et al. | 524/47 |
| 4,018,959 | 4/1977 | Demko et al. | 524/47 |

*Primary Examiner*—John Kight, III
*Assistant Examiner*—Nathan M. Nutter
*Attorney, Agent, or Firm*—Edwin M. Szala

[57] ABSTRACT

A crosslinking additive for imparting water resistance to starch-based corrugating adhesive compositions is prepared by reacting acetone and formaldehyde under aqueous alkaline conditions at 20°-80° C. in a molar ratio of 1 mole acetone to about 2 to 5.5 moles formaldehyde, adding to the reaction mixture at least an effective amount of dihydroxyethylene urea to scavenge the free formaldehyde in the mixture, and reacting until the amount of unreacted formaldehyde remaining is reduced to about 0.1-2%. The crosslinking additive thus obtained, which is low in free formaldehyde, may be added directly to a starch-based corrugating adhesive or may be first mixed with dimethylol dihydroxyethylene urea.

4 Claims, No Drawings

4,400,480

PROCESS FOR PREPARING CORRUGATED PAPERBOARD

This application is a division, of application Ser. No. 268,960, filed June 1, 1981, now U.S. Pat. No. 4,366,275.

BACKGROUND OF THE INVENTION

This invention relates to a starch-based, alkaline corrugating adhesive composition containing an improved crosslinking additive which imparts water resistance thereto.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use of operation of corrugators in general are described in U.S. Pat. Nos. 2,102,937 and 2,051,025 to Bauer.

The particular adhesive employed in the corrugating process is selected on the basis of several factors, including the type of bond required in the final application of the finished corrugated product. Starch-based adhesives are most commonly used due to their desirable adhesive properties, low cost and ease of preparation.

The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formulation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond.

It is often desired or necessary in the manufacture of corrugated paperboard that the adhesive yield water-resistant bonds which can withstand extended exposure to high humidity, liquid water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability, and pot life and exhibits excessive formaldehyde odor. In addition, acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as, e.g., urea-formaldehyde, resorcinol-formaldehyde, melamine-formaldehyde, phenol-formaldehyde, diacetone acrylamide-formaldehyde, ketone-aldehyde and urea-acetone-formaldehyde condensate, is added to the adhesive as a cross-linking additive for the amylaceous components to produce water-resistant bonds. Preferred among these resins for superior water-resistant properties are ketone-formaldehyde condensates as disclosed in U.S. Pat. No. 2,529,851, and particularly acetone-formaldehyde resins. The adhesives made from such resins, however, suffer from poor pot life and viscosity instability, as well as considerable formaldehyde odor.

In recent years, due to the uncertainty of the safety of formaldehyde, efforts have been made to reduce the levels of exposure to formaldehyde in the industrial workplace. Acetone-formaldehyde resins such as are employed as crosslinking additives in corrugating adhesives contain about 2.0 to 5.0% free (unreacted) formaldehyde by weight. Prior attempts to reduce formaldehyde levels in crosslinking additives as taught in U.S. Pat. Nos. 3,019,120 and 3,294,716 have not reduced free formaldehyde amounts to a significant extent and/or have resulted in diminution of the degree of water resistance achieved in the bonds formed.

Accordingly, it is an object of the present invention to provide a crosslinking additive with low levels of free formaldehyde which imparts water resistance, viscosity stability and improved pot life to starch-based, alkaline corrugating adhesive compositions.

It is another object to provide a water-resistant, starch-based alkaline adhesive composition containing such crosslinking additive in the manufacture of corrugated paperboard.

SUMMARY OF THE INVENTION

The above and related objects are achieved in the use of a crosslinking additive comprised of a mixture of acetone-formaldehyde condensate and dimethylol dihydroxyethylene urea (hereinafter referred to as DMDHEU), wherein at least a portion of the DMDHEU present is produced "in situ" via reaction of the free formaldehyde contained in the acetone-formaldehyde condensate with dihydroxyethylene urea (hereinafter referred to as DHEU).

The alkaline curing, starch-based corrugating adhesives of this invention comprise:
A. from about 10–40%, based on total weight of the adhesive, of starch, this including the ungelatinized as well as the gelatinized portions of the starch;
B. from about 0.3 to 5%, based on total weight of the starch, of an alkali such as, for example, sodium hydroxide;
C. from about 54 to 89%, based on total weight of the adhesive, of water; and
D. from about 0.3 to 10%, based on total weight of the starch, dry basis, of the corrugating adhesive crosslinking additive as described herein.

If desired, small amounts of borax, up to about 5% based on total weight of starch, may be added to the adhesive to improve the tackifying properties thereof.

In the process herein described for preparing the crosslinking additive, acetone and formaldehyde are reacted at about 20°–80° C. under aqueous alkaline conditions to produce a water-soluble acetone-formaldehyde condensate containing about 1–10% unreacted formaldehyde. At the completion of the reaction, while the resultant product is still at alkaline pH, DHEU is added in at least an effective amount to the reaction vessel and allowed to react at about 20°–80° C. until the unreacted formaldehyde remaining is reduced to about 0.1 to 2% by weight. The DHEU chemically "scavenges" free formaldehyde from the acetone-formaldehyde condensate, and DMDHEU is formed "in situ".

The amount of DMDHEU produced "in situ" depends on the initial level of free formaldehyde in the acetone-formaldehyde condensate and the amount of free formaldehyde remaining at the completion of the scavenging reaction. Additional DMDHEU may optionally be added to alter the final properties of the corrugating adhesive.

While DHEU is a known scavenger of formaldehyde and has been used in various applications, such as in the textile industry, for that purpose, it has not heretofore been employed in the preparation of additives for corrugating adhesive formulations. The DMDHEU, whether all of it is produced from the "in situ" reaction or whether part of it is externally added, has the unexpected effect of improving viscosity stability and pot life of the alkaline curing, starch-based corrugating adhesive without adversely affecting water resistance imparted by the acetone-formaldehyde condensate. At the same time the formaldehyde odor of the additive is reduced.

DESCRIPTION OF THE PREFERRED EMBODIMENTS

The corrugating adhesive composition of this invention is comprised of starch, water, alkali, the crosslinking additive, and optionally borax. The starch component, which may be the ungelatinized starch and/or gelatinized carrier starch portion of the adhesive composition herein may be sealed from any of the several starches, native or converted, heretofore employed in starch corrugating adhesive compositions. Suitable starches include, for example, those starches derived from corn, potato, waxy maize, sorghum, wheat, as well as high-amylose starches, i.e., starches which contain 30% or more by weight of amylose, and the various derivatives of these starches. Hence, among the applicable starches are included the various starch derivatives such as ethers, esters, thin-boiling types prepared by known processes such as mild acid treatments, oxidation, etc. and those derivatives of these starches which have high amylose contents. Preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch, ordinarily will be in the range of about 10–40% by total weight of the adhesive.

The remainder of the adhesive composition is composed of about 0.3–5% of an alkali such as sodium hydroxide, based on total weight of starch, about 0.3–10% on dry basis of the crosslinking additive as described below, based on total weight of starch, and about 54–89% of water, based on total weight of the adhesive. The preferred amounts of all ingredients are 10–35% starch, 1–4% alkali, 60–80% water and 1–5% crosslinking additive.

The alkali (base) employed herein is preferably sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

The crosslinking additive employed herein is a mixture of acetone-formaldehyde condensate and DMDHEU, wherein at least part of the DMDHEU present is formed by the reaction of the free formaldehyde contained in the acetone-formaldehyde condensate with DHEU. Preparation of the crosslinking additive for purposes of this invention involves first reacting acetone and formaldehyde in a molar ratio of one mole of acetone to about 2–5.5 moles of formaldehyde, preferably 3–5 moles, under aqueous alkaline conditions at a temperature of 20°–80° C., preferably 30°–50° C. The reaction may be conducted under a nitrogen atmosphere if desired. It will be recognized that the alkalinity and reaction temperature employed must be no greater than is necessary to produce a water-soluble condensate which has not cured into an infusible product. Typically, the pH of the reaction mixture is maintained at about 8–12, preferably 9–12, by incremental addition of a solution of an alkaline agent such as sodium hydroxide. The reaction time depends mainly on the temperature, alkalinity and desired solids content of the reaction mixture but is ordinarily such as to obtain a water-soluble acetone-formaldehyde condensate containing about 1–10% by weight of free formaldehyde, and preferably 1.5 to 4% free formaldehyde. The condensate will typically have a solids content of 40–65% by weight.

The improvement represented by the process of this invention resides in adding at least an effective amount of DHEU, preferably in solution form, to the reaction mixture before neutralization thereof. The practitioner will recognize that one mole of DHEU reacts with two moles of formaldehyde to form DMDHEU and will add appropriate amounts of DHEU solution as necessary to scavenge the free formaldehyde from the acetone-formaldehyde condensate. After addition of DHEU the pH of the reaction mixture may be lowered if desired to a level of preferably about 7–8, but such pH adjustment is not necessary to effect the reaction. The reaction temperature is ordinarily maintained at about 20°–80° C., with 30°–60° C. being preferred, and the reaction is allowed to proceed until the free formaldehyde level in the reaction mixture is reduced to the desired degree, generally between 0.1 and 2%, and preferably to between 0.1 and 1.5%, by weight of the mixture. The reaction mixture may then optionally be neutralized with an acid such as acetic or hydrochloric acid to a pH of generally about 5.5–6.5.

The crosslinking additive thus produced may be used directly as is in the starch-based alkaline corrugating adhesive formulation, or additional DMDHEU beyond that which is already present in the mixture from the "in situ" reaction may be added as necessary to lend desirable properties to the adhesive.

Optionally, up to about 5%, based on total weight of starch, of borax may be added as a tackifier.

In addition to the four essential ingredients of the adhesive composition of this invention, any conventional non-chemically functional additives may be incorporated into the adhesive in minor amounts, if desired. Such additives include, for example, wetting agents, proteins, plasticizers, solubilizing agents, rheology modifiers, water conditioners, penetration control agents, peptizers such as urea, gelatinization temperature modifiers, inert fillers such as clay and finely ground polymers, thickeners such as inorganic collodial clays, guar, hydroxyethyl cellulose, alginates, polyvinyl alcohol, polymers of ethylene oxide and the like, and emulsions such as polyvinyl acetate.

In the preparation of the adhesive composition herein, a portion of the total starch required in the adhesive is gelatinized in water with caustic soda to form the carrier, which is then slowly added to a mixture of raw starch, borax and water. The crosslinking additives may be added to the raw starch mixture or to the final adhesive mixture as desired.

The adhesive thus obtained can be used to bond single- or double-faced boards using any equipment which is presently employed for the preparation of corrugated board. Thus, the adhesive is maintained at a temperature preferably between 25° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

The examples which follow illustrate specific embodiments of the invention. In the examples all parts and percentages are given by weight and all temperatures in degrees Celsius unless otherwise noted.

In determining the amount of free formaldehyde contained in the products of Examples I–III, a titration method was employed whereby a 2–3 g sample of the product is weighed into a 250 ml flask to which is added several ice cubes and 2–3 drops thymolphthalein indicator (0.1% in alcohol). This is then titrated with 0.10 N sodium hydroxide until a faint blue color develops. A sodium sulfite solution of 127 g/l is added in an amount of 50 ml and the resulting solution is titrated with 0.50 N hydrochloric acid until the blue color disappears. The formula to determine free formaldehyde content of the sample is:

$$\text{Percent free HCHO} = \frac{\text{ml HCl} \times 1.50}{\text{weight of sample (g)}}$$

EXAMPLE 1

This example illustrates the preparation of a crosslinking additive useful in the corrugating adhesives of this invention.

A reaction vessel equipped with a thermometer, condenser, pH electrodes and a means of stirring was charged under nitrogen atmosphere with 600 g of 50% formaldehyde solution, 300 g water and 145 g acetone. The pH was adjusted to 11.0 by adding 10 molar sodium hydroxide solution thereto and the mixture was heated to 35° C. An exothermic reaction was thereby initiated wherein the temperature rose to 45° C. Cooling was applied to reduce the temperature to 40° C. Additional sodium hydroxide was added intermittently so as to maintain the pH at from about 10.7 to 11.3 for 7 hours. After this period the solids content of the reaction mixture was 53.5% and the free formaldehyde content was determined to be 2.5% by the titration method above described. At this point, 163 g of DHEU solution of 25% solids was added to the entire reaction mixture and the pH was lowered to 7.5 with acetic acid. The reaction proceeded at 35°–40° C. until the free formaldehyde content of the mixture was reduced to 0.7%. The mixture, after being adjusted to pH 5.5 by the addition of acetic acid, had a solids content of about 49.0% by weight.

EXAMPLE II

To 89.6 parts of the crosslinking additive of Example I was added 10.4 parts of a solution of DMDHEU containing about 47.0% solids by weight and 0.5% free formaldehyde as determined by titration. The solids content of the resulting additive was about 48.0% and the amount of free formaldehyde therein was determined to be 0.7%.

EXAMPLE III (Comparative)

A standard commercial acetone-formaldehyde condensate was prepared for comparative purposes by following the procedure of Example 1 except that no DHEU was added to the reaction mixture. The additive, which had a free formaldehyde content of 2.5% and a solids content of 53.5%, was neutralized by addition of acetic acid to a pH of 5–6.

EXAMPLE IV

This example illustrates the preparation of the corrugating adhesives representative of this invention.

Preparation of Carrier Starch:

To 2835.6 g of water was added 1360 g of high-amylose corn starch (about 70% amylose by weight) and the resultant slurry was heated to 54° C. with stirring. About 238.6 g of water containing 108.8 g of sodium hydroxide was then added to the slurry and heating was continued for about 15 minutes, after which about 2835.6 g of water was added to cool and dilute the resultant dispersion.

Preparation of Full-formulation Adhesive:

The carrier starch dispersion above prepared was added over a 20-minute period to a slurry of 4760 g corn starch, 108.8 g borax ($Na_2B_4O_7.10H_2O$) and 8506.8 g water. The mixture was stirred for 30 minutes and then divided into five 900 g portions. To four of these adhesive portions one of the indicated condensate resins of Examples I–III was added in the given amount to form adhesives A–D described in Table I. Adhesive E served as a control containing no resin.

TABLE I

| Adhesive | Crosslinking Additive | Amount of Crosslinking Additive (% on solids basis) |
| --- | --- | --- |
| A | Example I | 2.1 |
| B | Example II | 2.3 |
| C (comparative) | Example III | 2.1 |
| D (comparative) | Example III | 2.4 |
| E (control) | None | 0 |

EXAMPLE V

It is well recognized that cooked starch dispersions (and starch dispersions containing a crosslinking agent of the prior art in particular) will tend to thicken with time, and this phenomenon is usually observed in all corrugating adhesives based on such starch dispersions. In contrast, the corrugating adhesives of this invention, by virtue of the presence of DMDHEU, whether formed "in situ" or also added thereto, exhibit a relatively stable viscosity over a given period of time as compared to comparable prior art adhesives. Table II summarizes the viscosity data obtained on testing Adhesives A-E prepared as described above. The adhesives were aged for periods of 1 hour and 23 hours at 41° C. with mild agitation and tested after each aging period for their viscosity by two separate methods. In one method, a Brookfield Viscometer (at 20 rpm setting) was employed to measure the viscosity in centipoise; in the other method the Stein-Hall cup measurement was employed, wherein the time taken for the adhesive to flow between the two markers on the standard cup was measured in seconds.

TABLE II

| Adhesive | Brookfield Viscosity (cps) | | Stein-Hall Viscosity (sec.) | |
| --- | --- | --- | --- | --- |
|  | 1 hour | 23 hours | 1 hour | 23 hours |
| A | 1535 | 2680 | 50 | 121 |
| B | 1645 | 2530 | 51 | 120 |
| C (comparative) | 2150 | 2950 | 79 | 135 |
| D (comparative) | 3250 | 6500 | 106 | >200 |
| E (control) | 880 | 1800 | 43 | 100 |

The absolute viscosity of the adhesives should be low as it is in the control E which contains no water-resistant resin. It is seen that the viscosities of Adhesives A and B of this invention are far lower after 1 hour of aging and also after 23 hours of aging than the viscosities of the adhesives containing acetone-formaldehyde condensate without DMDHEU (C and D) using both tests.

EXAMPLE VI

The improved pot life of the adhesives of this invention can be largely attributed to the lack of any significant crosslinking of the starch taking place prior to its application and heating in the corrugating process itself. Thus, it can be understood that where crosslinking of the starch does take place prematurely at room temperatures while waiting for use (as, for example, with many prior art adhesives used for this purpose) the ability of the adhesive subsequently to form a film rapidly and efficiently as is necessary in forming an adhesive bond is correspondingly diminished. It follows that premature crosslinking of the starch will likewise impair the desired tack and water resistant bonding properties of the thus affected adhesive. The practical consequence of premature crosslinking is that the corrugated board manufacturer is often forced to discard adhesive that has not been used within a certain time period.

The following procedure was used in determining and effectively demonstrating the improved pot life of the adhesive compositions of this invention. Adhesives A-E were tested for pot life after being aged for a period of 24 hours at 40° C. with respect to Brabender viscosity over a time-temperature relationship as follows: A stock solution containing 2597.8 ml distilled water, 18.28 g sodium hydroxide and 17.0 g borax ($Na_2B_4O_7.10H_2O$) was allowed to stand until it reached room temperature. A total of 360 g of this solution was then mixed with 100 g of the adhesive to be tested. The mixture thus obtained was placed into a Brabender Visco-Amylo-Graph (350 cm-g sensitivity cartridge) and heated to 35° C. After 5 minutes of holding at 35° C., the mixture was heated at a rate of about 3.7° C. per minute so as to reach a temperature of 90° C. in about 15 minutes. To complete the test, the mixture was held at 90° C. until 30 minutes had elapsed from the time at which 35° C. was first attained.

Adhesives A and B, i.e., the adhesives of this invention, and Adhesive E, containing no crosslinking additive, each exhibited a sharp increase in viscosity which peaked at an elapsed time of about 9 minutes at a temperature of about 50° C. and thereafter exhibited a gradual decrease in viscosity. The increase in viscosity corresponds to the swelling of the starch granules while the decrease in viscosity corresponds to the bursting of the granules, indicating that little or no crosslinking had taken place during the aging period. In contrast, Adhesives C and D, the comparative adhesives containing the acetone-formaldehyde condensate, exhibited only a minimal increase in viscosity over the entire 30-minute run and showed no peak viscosity at all. This behavior is characteristic of crosslinked starches. Adhesives C and D cannot be expected to provide good bonds which rely on "in situ" gelatinization and crosslinking, since it has already crosslinked during its 24-hour aging period and exhausted its potential for crosslinking.

EXAMPLE VII

The water resistant properties of bonds formed with starch-based corrugating adhesives are largely derived from the crosslinking to reduce the solubility of the starch which occurs during the "in situ" gelatinization. Where premature crosslinking of the starch takes place during storage of the adhesive prior to its actual use, the starch will have little or no remaining swelling potential and will not crosslink at the bonding site of the corrugated paperboard laminate. As demonstrated in the previous example, the superior pot life of the adhesives of this invention, as evaluated by means of a viscosity-time-temperature relationship, indicated little, or no, crosslinking to take place during a 24-hour aging period. It is to be expected, therefore, that the adhesive herein, even after aging, would be capable of forming bonds having a high degree of water resistance.

Adhesives A-C were aged for a period of 23 hours at a temperature of 41° C. and then employed in the preparation of the double-faced bond in corrugated paperboard via the following method, which simulates conditions on the double-back section of a corrugator.

Each adhesive was applied at 10 mil thickness by a Bird applicator to a glass plate and was transferred to sheets of single-face web (of 62 lb/thousand sq ft wet strength liner and 30 lb/thousand sq ft wet strength medium) by means of direct hand pressure. The single-face samples were then placed on top of 62 lb/thousand sq ft wet strength liner and the resultant double-faced board was bonded at 0.25 psi on a hot plate at 177° C. for 4 seconds. The bonded boards were then placed in a conditioning atmosphere of 22° C., 50% relative humidity for 24 hours, after which 2×4 inch samples of each of the boards were placed in water at 22° C. for 24 hours.

At the end of this period the samples were evaluated after 1 hour immersion in water by a wet pin adhesion test based on that of the TAPPI Standard UM 802 (formerly R 337) using a conventional testing apparatus obtainable from Testing Machines Incorporated, Mineola, N.Y. The test results were recorded in pounds (per 24 inches of glue line) required to separate completely the double-face liner from the single-face web. The results are indicated in Table III, with the highest values representing the best results.

TABLE III

| Adhesive | Wet Pin Adhesion Value |
| --- | --- |
| A | 14 |
| B | 13 |
| C (comparative) | 12 |

The results show that Adhesives A and B of this invention, which contain crosslinking additives low in free formaldehyde, provide adequate water resistance in corrugated board comparable to that obtained for adhesives containing acetone-formaldehyde condensate without DMDHEU (containing 2-3% free formaldehyde).

EXAMPLE VIII

This example illustrates the use of a representative corrugating adhesive of this invention in an actual manufacturing process for producing corrugated board.

Preparation of Carrier Starch

To 100 gallons of water was added 400 lb of a high-amylose corn starch (about 70% amylose by weight) and the resultant slurry was heated to 55° C. with agitation. About 5 gal water containing 32 lb sodium hydroxide was then added to the slurry and mixing was continued for about 15 minutes. At the end of this period, about 100 gal of water was added to cool and dilute the resultant dispersion.

Preparation of Full-Formulation Adhesive

The carrier starch dispersion above prepared was added to a slurry of 1400 lb corn starch, 24 lb borax ($Na_2B_4O_7.5H_2O$) and about 300 gal of water. The mixture was stirred for about 20 minutes, after which about 85 lb (wet basis) of the crosslinking additive of Example II was added. Stirring was continued until the adhesive was uniform in texture. The viscosity of the thus-prepared adhesive was 52 sec. at 37° C. as measured by the Stein-Hall cup method.

The adhesive of this example was employed in the manufacture of corrugated board of a double-faced type, with 38 lb/thousand sq ft liners, 33 lb/thousand sq ft medium and adhesive application of 4.7 lb/thousand sq ft dry basis. Samples of board were taken at the delivery station of the corrugator and allowed to equilibrate for 24 hours at 22° C. and 50% relative humidity before testing. Thereafter, 6×8 in. samples of board were placed in water at 22° C. for 24 hours. At the end of this period board samples were inspected for water resistance. When attempts were made to separate the board samples into individual plies of paper, fiber tearing occurred for both the single-face and double-face bonds, indicating that the samples were water resistant.

In a separate evaluation for water resistance using the wet pin adhesion test, samples of board produced in the manner described hereinabove were cut into 2×4 inch pieces and placed in a chamber maintained at about 55° C. and 95% relative humidity for 24 hours, to simulate the environment of corrugated board in a stacked load. The board samples were allowed to equilibrate at 22° C. and 50% relative humidity for 24 hours and then were soaked in water at 22° C. for 24 hours. Evaluation was then made of each sample by the wet pin adhesion test described in Example VII, with the results indicated in Table IV:

TABLE IV

| | Wet Pin Adhesion Value | |
| --- | --- | --- |
| Adhesive | Single-face Bond | Double-face Bond |
| Employing crosslinking additive of Example II | 13 | 14 |

The wet pin adhesion values obtained are commercially acceptable values based on those values obtained using water-resistant adhesives of the prior art such as those incorporating the crosslinking additive of Example III.

In summary, this invention is seen to provide a crosslinking additive with low levels of free formaldehyde which imparts water resistance, viscosity stability and improved pot life to starch-based alkaline curing corrugating adhesive compositions.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. A process for preparing corrugated paperboard comprising the steps of:
   (1) applying to the tips of the corrugations of a fluted paper strip a water-resistant alkaline curing corrugating adhesive composition comprising:
      A. from about 10 to 40%, based on total weight of the adhesive, of starch, this including the ungelatinized as well as the gelatinized portions of the starch;
      B. from about 0.3 to 5%, based on total weight of the starch, of an alkali;
      C. from about 54 to 89%, based on total weight of the adhesive, of water; and
      D. from about 0.3 to 10%, based on total weight of the starch, dry basis, of a crosslinking additive prepared by reacting acetone and formaldehyde in a molar ratio of 1 mole of acetone to about 2 to 5.5 moles of formaldehyde under aqueous alkaline conditions at about 20°-80° C. to obtain a water-soluble acetone-formaldehyde condensate containing about 1-10% unreacted formaldehyde; adding to the condensate at least an effective amount of dihydroxyethylene urea to react with the unreacted formaldehyde present therein; and allowing the reaction to proceed at about 20°-80° C. until the unreacted formaldehyde remaining is reduced to about 0.1-2% by weight; and (2) applying a facing to the adhesive-coated tips of said fluted paper strip to form an adhesive bond.

2. The process of claim 1 wherein the adhesive further comprises up to 5%, based on the total weight of the starch, of borax.

3. The process of claim 1 wherein the adhesive comprises 18–35% starch, 1–4% alkali, 60–81% water and 1–5% crosslinking additive.

4. The process of claim 1 wherein the adhesive dimethylol dihydroxyethylene urea is added to the crosslinking additive after preparation thereof.

* * * * *